(12) United States Patent
Huang et al.

(10) Patent No.: US 10,989,968 B2
(45) Date of Patent: Apr. 27, 2021

(54) OPTICAL ELEMENT AND DISPLAY DEVICE

(71) Applicant: Coretronic Corporation, Hsin-Chu (TW)

(72) Inventors: Yi-Pai Huang, Hsin-Chu (TW); Tai-Hsiang Jen, Hsin-Chu (TW); Po-Yuan Hsieh, Hsin-Chu (TW); Jui-Yi Wu, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 208 days.

(21) Appl. No.: 16/118,452

(22) Filed: Aug. 31, 2018

(65) Prior Publication Data

US 2019/0072805 A1    Mar. 7, 2019

(30) Foreign Application Priority Data

Sep. 7, 2017  (CN) .......................... 201710798903.2

(51) Int. Cl.
*G02F 1/1347* (2006.01)
*G02F 1/1343* (2006.01)
(Continued)

(52) U.S. Cl.
CPC ..... *G02F 1/13471* (2013.01); *G02B 27/0101* (2013.01); *G02B 30/24* (2020.01);
(Continued)

(58) Field of Classification Search
CPC ........... G02F 1/13471; G02F 1/133371; G02B 27/0101
See application file for complete search history.

(56) References Cited

U.S. PATENT DOCUMENTS 5,963,291 A * 10/1999 Wu .................. G02F 1/0311
                                          250/225
6,222,627 B1   4/2001 Seitz et al.
(Continued)

FOREIGN PATENT DOCUMENTS

CN          103189781          7/2013
CN          103885181          6/2014
(Continued)

OTHER PUBLICATIONS

Kwon et al., "Resolution-enhancement for an orthographic view image display in an integral imaging microscope system," Biomedical Optics Express, Feb. 9, 2015, pp. 736-746.
(Continued)

*Primary Examiner* — Lucy P Chien
(74) *Attorney, Agent, or Firm* — JCIPRNET

(57) ABSTRACT

An optical element configured to allow an image beam passing through is provided. The optical element includes a first and a second birefringent layer and a gas layer between the first and the second birefringent layer. An extension direction of the gas layer is inclined with respect to an extension direction of the optical element, wherein the image beam passes through the first birefringent layer, the gas layer and the second birefringent layer in sequence. A first and a second sub image beam having different deflection angles are generated from the image beam when the image beam enters the gas layer. After the first and the second sub image beam are emitted from the second birefringent layer, a transmission path of the first and the second sub image beam are offset from each other by an offset distance, thereby improving resolution of an image to be viewed.

20 Claims, 4 Drawing Sheets

(51) Int. Cl.
*G02B 27/01* (2006.01)
*G02F 1/29* (2006.01)
*G02F 1/1333* (2006.01)
*G02F 1/03* (2006.01)
*G02B 30/24* (2020.01)
*G02B 30/25* (2020.01)

(52) U.S. Cl.
CPC ........... *G02B 30/25* (2020.01); *G02F 1/0322* (2013.01); *G02F 1/13439* (2013.01); *G02F 1/133371* (2013.01); *G02F 1/29* (2013.01); *G02F 2203/50* (2013.01)

(56) References Cited

U.S. PATENT DOCUMENTS

| | | | |
|---|---|---|---|
| 6,919,982 | B2 | 7/2005 | Nimura et al. |
| 7,439,938 | B2 | 10/2008 | Cho et al. |
| 7,791,807 | B2 | 9/2010 | Pasca et al. |
| 8,842,064 | B2 | 9/2014 | Robinson |
| 2007/0097277 | A1 | 5/2007 | Hong |
| 2007/0216829 | A1* | 9/2007 | Sumiyoshi ........... G09G 3/3611 349/74 |
| 2009/0244412 | A1* | 10/2009 | Tsukagoshi .......... G02B 5/3016 349/8 |
| 2010/0026920 | A1 | 2/2010 | Kim et al. |
| 2013/0021226 | A1 | 1/2013 | Bell |
| 2014/0071538 | A1 | 3/2014 | Muller |
| 2015/0036209 | A1 | 2/2015 | Ichihashi et al. |
| 2015/0262424 | A1 | 9/2015 | Tabaka et al. |

FOREIGN PATENT DOCUMENTS

| | | |
|---|---|---|
| CN | 104777622 | 7/2015 |
| CN | 104820292 | 8/2015 |
| CN | 105629469 | 6/2016 |
| CN | 105988228 | 10/2016 |
| EP | 1197766 | 4/2002 |
| EP | 2631702 | 8/2013 |
| JP | 2011118168 | 6/2011 |
| TW | I448791 | 8/2014 |
| WO | 2009044334 | 4/2009 |

OTHER PUBLICATIONS

Jen et al., "Dynamic integral imaging display with electrically moving array lenslet technique using liquid crystal lens," Optics Express, Jul. 7, 2015, pp. 18415-18421.

Lee et al., "Resolution Enhanced 3D Light Field Microscope with Liquid Crystal Wedge," International Display Workshops in conjunction with Asia Display 2016, Dec. 2016, pp. 2-5.

Maimone et al., "Computational augmented reality eyeglasses," 2013 IEEE International Symposium on Mixed and Augmented Reality (ISMAR), Oct. 2013, pp. 29-38.

Hu et al., "Design and tolerance of a free-form optical system for an optical see-through multi-focal-plane display," Applied Optics, Nov. 2015, pp. 9990-9999.

Song et al., "Design of light field head-mounted display," Proceedings vol. 9293, International Optical Design Conference 2014, Jun. 2014.

Huang et al., "Eyeglasses-free Display: Towards Correcting Visual Aberrations with Computational Light Field Displays," ACM Transactions on Graphics, Jul. 2014, pp. 59:1-59:11.

Lanman et al., "Near-Eye Light Field Displays," SIGGRAPH Talks, Nov. 1, 2013.

Aksit et al., "Slim near-eye display using pinhole aperture arrays," Applied Optics, Apr. 9, 2015, pp. 3422-3427.

"Search Report of Europe Counterpart Application", dated Apr. 23, 2019, pp. 1-13.

"Search Report of Europe Counterpart Application", dated Jan. 25, 2019, p. 1-p. 13.

Paul F McManamon et al., "A Review of Phased Array Steering for Narrow-Band Electrooptical Systems, " Journals & Magazines, Proceedings of the IEEE, vol. 97, Issue 6, May 19, 2009, pp. 1078-1096.

"Office Action of China Counterpart Application", dated Jul. 17, 2020, p. 1-p. 9.

"Office Action of China Counterpart Application", dated Mar. 1, 2021, p. 1-p. 7.

* cited by examiner

OPTICAL ELEMENT AND DISPLAY DEVICE

CROSS-REFERENCE TO RELATED APPLICATION

This application claims the priority benefit of China application serial no. 201710798903.2, filed on Sep. 7, 2017. The entirety of the above-mentioned patent application is hereby incorporated by reference herein and made a part of this specification.

BACKGROUND

Field of the Invention

The invention relates to an optical element and a display device, particularly to a near-eye display for displaying two-dimensional information or three-dimensional information and an optical element for a near-eye display.

Description of Related Art

With rapid development of near-eye displays (NEDs), in order to allow a user to see a more realistic image and enjoy a more comfortable visual effect when wearing the near-eye display, near-eye light field displays have been launched. A major difference between the near-eye light field displays and traditional near-eye displays lies in that, through a light field imaging mechanism, the near-eye light field displays have an advantage of considerably reducing an overall optical path length and can thus realize lightweight and slim near-eye displays. Meanwhile, the near-eye light field displays may also offer a focus adjustment function required by the user.

However, for the near-eye light field displays, not only two-dimensional image information is required, but also three-dimensional information of an image beam intended to be displayed is required. Thus, most near-eye light field displays have a problem of drastic reduction in image resolution. Therefore, how to effectively improve the image resolution of the current near-eye light field displays or general near-eye displays is one of the issues that receive attention of people in this field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical element and a display device which can improve resolution capability of existing display devices. Through a space division multiplexing architecture of the invention, a viewer may see an original low-resolution image at different times to get an improved high-resolution image.

To achieve one of, a part of or all of the above objectives or other objectives, an embodiment of the invention provides an optical element configured to allow an image beam passing through. The optical element includes a first birefringent layer, a second birefringent layer and a gas layer. The gas layer has a thickness and is disposed between the first birefringent layer and the second birefringent layer. An extension direction of the gas layer is inclined with respect to an extension direction of the optical element, wherein the image beam passes through the first birefringent layer, the gas layer and the second birefringent layer in sequence. A first sub image beam and a second sub image beam having different deflection angles are generated from the image beam when the image beam enters the gas layer. After being emitted from the second birefringent layer, the first sub image beam and the second sub image beam are offset from each other by an offset distance.

To achieve one of, a part of or all of the above objectives or other objectives, an embodiment of the invention provides a display device including a display panel, an optical element and a lens element. The display panel is configured to provide an image beam. The optical element is disposed on one side of the display panel and is configured to allow the image beam passing through. The optical element includes a first birefringent layer, a second birefringent layer and a gas layer. The gas layer has a thickness and is disposed between the first birefringent layer and the second birefringent layer. An extension direction of the gas layer is inclined with respect to an extension direction of the optical element, wherein the image beam provided by the display panel passes through the first birefringent layer, the gas layer and the second birefringent layer in sequence. A first sub image beam and a second sub image beam having different deflection angles are generated from the image beam when the image beam enters the gas layer. After being emitted from the second birefringent layer, the first sub image beam and the second sub image beam are offset from each other by an offset distance.

Based on the above, the embodiments of the invention at least have one of the following advantages or effects. In the embodiments of the invention, the optical element includes the first birefringent layer, the second birefringent layer and the gas layer, and the optical element is disposed between the display panel and the lens element, wherein the extension direction of the gas layer is inclined with respect to the extension direction of the optical element, and the gas layer is disposed between the first birefringent layer and the second birefringent layer. Accordingly, the image beam passes through the first birefringent layer, the gas layer, the second birefringent layer and the lens element in sequence. Moreover, the first sub image beam and the second sub image beam having different deflection angles are generated from the image beam when the image beam enters the gas layer, wherein the first sub image beam and the second sub image beam are offset from each other by the offset distance after being emitted from the second birefringent layer. Thus, the user will see a high-resolution image synthesized by the first sub image beam and the second sub image beam.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
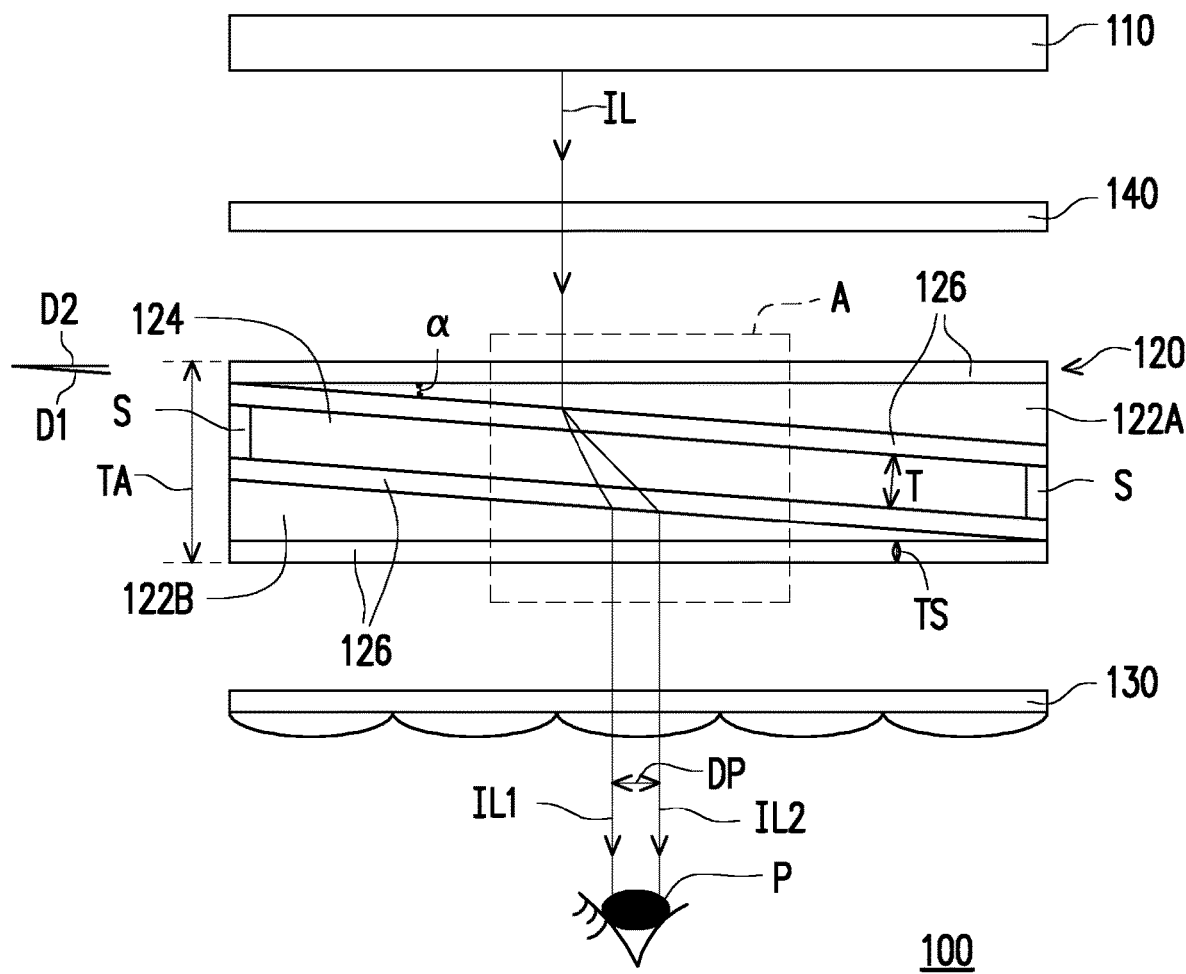
FIG. 1 is a schematic cross-sectional view of a display device of the invention.
Figure 2:
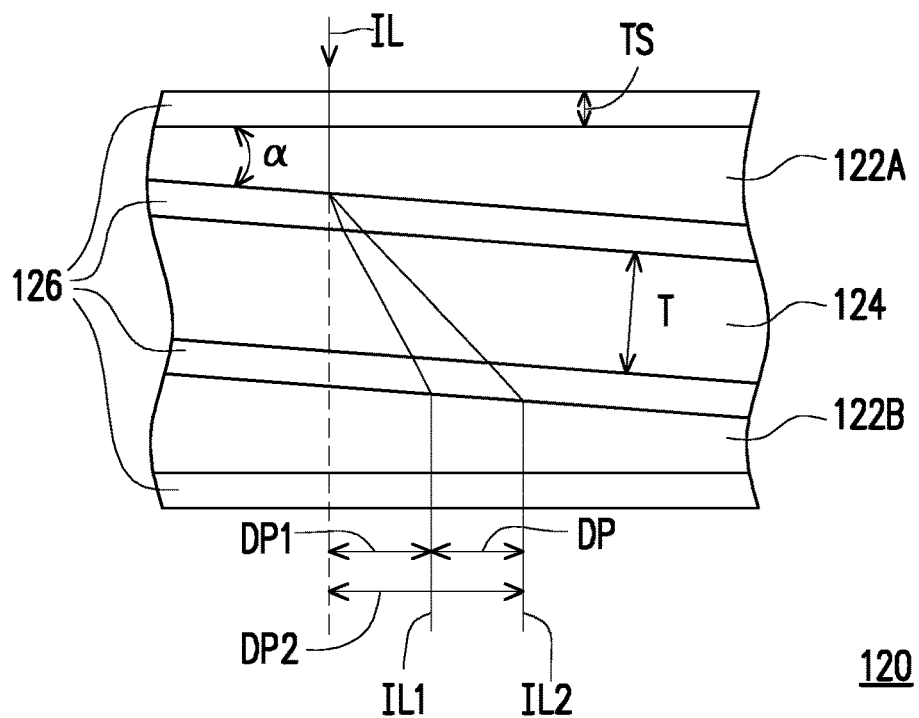
FIG. 2 is a schematic enlarged view of area A in FIG. 1.
Figure 3:
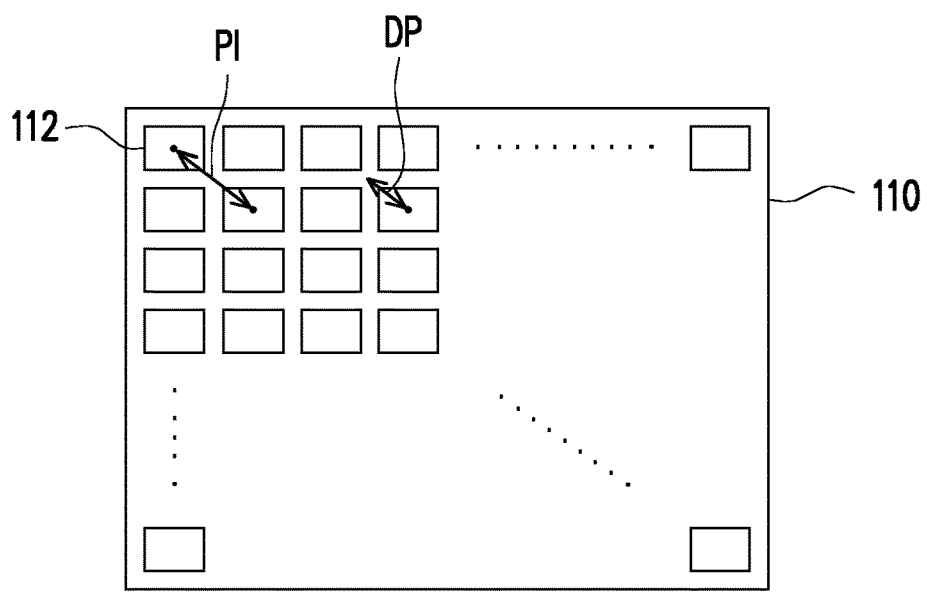
FIG. 3 is a schematic top view of a display panel of FIG. 1.

FIG. 1 is a schematic cross-sectional view of a display device of the invention. FIG. 2 is a schematic enlarged view of area A in FIG. 1, wherein FIG. 1 is a schematic cross-sectional view along a diagonal direction of pixels (see pixels 112 as shown in FIG. 3) of a display panel. Referring to FIG. 1 and FIG. 2, in the present embodiment, a display device 100 includes a display panel 110, an optical element 120 and a lens element 130. The display panel 110 is configured to provide an image beam IL. The optical element 120 is disposed on one side of the display panel 110 and is disposed between the display panel 110 and the lens element 130, and the optical element 120 is configured to allow the image beam IL passing through.

In detail, the optical element 120 includes a first birefringent layer 122A, a second birefringent layer 122B and a gas layer 124. The first birefringent layer 122A and the second birefringent layer 122B are, for example, liquid crystal layers. However, in other embodiments, the first birefringent layer 122A and the second birefringent layer 122B may be made of other materials having birefringence, such as anisotropic materials (e.g., uniaxial crystals such as calcite, quartz, rubies and so on). The invention is not limited thereto. In the present embodiment, the first birefringent layer 122A and the second birefringent layer 122B are antisymmetrically arranged in, for example, a wedge shape, so that a large-thickness end portion of the first birefringent layer 122A and a small-thickness end portion of the second birefringent layer 122B are located in the same area, and a small-thickness end portion of the first birefringent layer 122A and a large-thickness end portion of the second birefringent layer 122B are located in the same area, which renders the optical element 120 a plate structure, i.e., two outermost substrates 126 of the optical element 120 are parallel to each other. However, in other different embodiments, the first birefringent layer 122A and the second birefringent layer 122B may have other polyhedron shapes. The invention is not limited thereto.

The gas layer 124 has a thickness T and is disposed between the first birefringent layer 122A and the second birefringent layer 122B. In the present embodiment, the gas layer 124 is, for example, an air layer. However, in other embodiments, the gas layer 124 may include other types of gases. The invention is not limited thereto. An extension direction D1 of the gas layer 124 is inclined with respect to an extension direction D2 of the optical element 120. In other words, the optical element 120 has a sandwich structure, and the extension direction D1 of the gas layer 124 sandwiched in the center of the sandwich structure has an angle α with respect to the extension direction D2 of the optical element 120. In the present embodiment, the angle α is in the range of, for example, 0 degree to 5 degrees. However, the invention is not limited thereto.

In addition, in the present embodiment, the optical element 120 further includes a plurality of substrates 126. The substrates 126 are transparent (light transmissive) substrates made of, for example, plastic or glass, and are located respectively between the first birefringent layer 122A and the gas layer 124 and between the gas layer 124 and the second birefringent layer 122B, for spacing the first birefringent layer 122A, the second birefringent layer 122B and the gas layer 124 so as to enhance structural stability of the optical element 120. Moreover, two substrates 126 are disposed on both sides of the first birefringent layer 122A, and two substrates 126 are disposed on both sides of the second birefringent layer 122B, which may fix the first birefringent layer 122A and the second birefringent layer 122B, thus preventing unwanted oscillations that lead to poor image quality. The optical element 120 may further include a plurality of supports S disposed around the gas layer 124 and located between the substrates 126 on two opposite sides of the gas layer 124, and the supports S are configured to partition off the gas layer 124 to cause the gas layer 124 to have the thickness T.

In the present embodiment, the display device 100 is, for example, a near-eye light field display, and the display panel 110 is, for example, a thin film transistor-liquid crystal display (TFT-LCD), an organic light-emitting diode (OLED) display or any other suitable type of display. The invention is not limited thereto. The display panel 110 includes a plurality of pixels (see the pixels 112 as shown in FIG. 3) arranged in array, wherein the number of the pixels is not limited and is determined according to resolution of the display panel 110. In the present embodiment, when the display panel 110 is an opaque display panel, the display device 100 may achieve a virtual reality (VR) display effect. However, in other embodiments, the display panel 110 may be a transparent display panel, and the invention is not limited thereto.

The lens element 130 is, for example, a microlens array. Therefore, by combination with the lens element 130, the display panel 110 can provide the image beam IL having two-dimensional information or three-dimensional information, thereby displaying a light field image. However, in some embodiments, the lens element 130 may be used as an ocular of the near-eye display device 100 and is in the form of, for example, a single lens. The invention is not limited thereto.

The image beam IL passes through the first birefringent layer 122A, the gas layer 124, the second birefringent layer 122B and the lens element 130 in sequence. In detail, the image beam IL includes a first polarized beam and a second polarized beam which alternately appear. For example, in an embodiment, the display panel 110 sequentially generates the first polarized beam and the second polarized beam. The first polarized beam and the second polarized beam have polarization directions perpendicular to each other. The image beam IL is deflected when entering the optical element 120. That is, when the image beam IL enters the gas layer 124 of the optical element 120, a first sub image beam IL1 and a second sub image beam IL2 having different deflection angles are generated from the image beam IL. That is, the first polarized beam and the second polarized beam are deflected in the optical element 120, and the first sub image beam IL1 and the second sub image beam IL2 having different deflection angles are generated respectively from the first polarized beam and the second polarized beam when the first polarized beam and the second polarized beam enter the gas layer 124 of the optical element 120. After the first sub image beam IL1 and the second sub image beam IL2 are emitted from the second birefringent layer 122B, a transmission path of the first sub image beam IL1 and a transmission path of the second sub image beam IL2 are offset from each other by an offset distance DP. Therefore, through high-speed movement of image beams, the first sub image beam IL1 and the second sub image beam IL2 produce a superposition effect which, together with the phenomenon of persistence of vision of human eye, improves resolution of an image seen by the human eye. The offset distance DP is related to the thickness T, the inclination angle (i.e., angle α) of the gas layer 124, and the birefringence of the first birefringent layer 122A and the second birefringent layer 122B. More specifically, the offset distance DP is also related to thickness of the first birefringent layer 122A and the second birefringent layer 122B, and may be related to thickness of the liquid crystal layer in another embodiment. In the present embodiment, since the liquid crystal layers used as the first birefringent layer 122A and the second birefringent layer 122B have birefringence, they have different refractive indices with respect to the first polarized beam and the second polarized beam. Hence, the first polarized beam and the second polarized beam pass a boundary between the liquid crystal layers and the gas layer 124 at different polarization angles, thus resulting in the offset distance DP. In detail, the offset distance is related to the thickness of the first birefringent layer and the second birefringent layer, the inclination angle and the thickness of the gas layer, and the birefringence of the first birefringent layer and the second birefringent layer.

Specifically, in the present embodiment, the display device 100 further includes an adjustable phase retarder 140 suitable for forming the image beam IL emitted by the display device 100 into two sequential polarized beams. For example, the display device 100 may be a TFT-LCD, and the adjustable phase retarder 140 may be a liquid crystal cell. Thus, when the non-polarized image beam IL emitted by the display panel 110 enters the adjustable phase retarder 140, by controlling a phase retardation amount of the adjustable phase retarder 140, the first polarized beam and the second polarized beam having polarization directions perpendicular to each other are generated, and thereby the first sub image beam IL1 and the second sub image beam IL2 are generated in the optical element 120. However, in other embodiments, the adjustable phase retarder 140 may be adjusted according to the type of the display device 100 used. For example, the adjustable phase retarder 140 may be replaced with a twisted nematic (TN) liquid crystal panel, a half wave plate, a quarter wave plate, a polarizer, any other type of adjustable phase retarder, or a module combining the above, as long as it is capable of modulating the image beam IL into a light beam that can be polarized in two alternate directions as time passes. The invention is not limited thereto.

In other words, before being incident on the optical element 120, the image beam IL is two sequential polarized beams. Thus, when the image beam IL is transmitted and reaches the first birefringent layer 122A in the optical element 120, the first polarized beam and the second polarized beam in the image beam IL may respectively be refracted according to the birefringence characteristic of the first birefringent layer, and the first polarized beam and the second polarized beam are refracted at different angles, thus forming the first sub image beam IL1 and the second sub image beam IL2 having different deflection angles. Next, the first sub image beam IL1 and the second sub image beam IL2 are respectively transmitted in a straight line within the gas layer 124. Thus, as the transmission path in the gas layer 124 is increased, the offset distance DP between the first sub image beam IL1 and the second sub image beam IL2 also increases. Finally, when the first sub image beam IL' and the second sub image beam IL2 are transmitted and reach the second birefringent layer 122B, since the second birefringent layer 122B has the same birefringence characteristic as the first birefringent layer 122A and the second birefringent layer 122B and the first birefringent layer 122A are anti-symmetrically arranged, the first sub image beam IL1 and the second sub image beam IL2 will be refracted back in the transmission direction in which they were originally incident on the optical element 120. In other words, the main beam axes of the first sub image beam IL1 and the second sub image beam IL2 are parallel to the main beam axis of the image beam IL.

In addition, the offset distance DP between the first sub image beam IL1 and the second sub image beam IL2 increases as the thickness T of the gas layer 124 increases, and the extent of the increase is greater than in a known method of increasing the offset distance DP in a liquid crystal element. In addition, the refraction angles of the first sub image beam IL1 and the second sub image beam IL2 in the optical element 120 may vary with the inclination angle (i.e., angle α) of the gas layer 124 and the birefringence of the first birefringent layer 122A and the second birefringent layer 122B. Therefore, a total thickness TA of the optical element 120 can be reduced, and the manufacturing process is simplified.

The first sub image beam IL1 and the second sub image beam IL2 which have passed through the optical element 120 pass through the lens element 130, and the first sub image beam IL1 and the second sub image beam IL2 converge at the lens element 130 to enter a pupil P, wherein the pupil P may be the pupil of a user's eye, or an image capturing device such as a video camera, a charge-coupled device (CCD) or the like. The invention is not limited thereto. After the first sub image beam IL1 and the second sub image beam IL2 pass through the eye pupil, the first sub image beam IL1 and the second sub image beam IL2 may form a high-quality image on the retina of the user's eye. That is, the resolution of an image received by the display panel 110 from an image source (not shown) is smaller than the resolution of the image formed on the retina of the eye. However, in other embodiments, the pupil P may be, for example, a position where an aperture stop of a general optical lens is located.

FIG. 3 is a schematic top view of a display panel of FIG. 1. Referring to FIG. 1 to FIG. 3 together, in detail, in the present embodiment, the offset distance DP between the first sub image beam IL1 and the second sub image beam IL2 is smaller than a pitch PI of the pixels 112 on the display panel 110 in the diagonal direction. The pitch PI is defined as a distance between a center position of one pixel 112 and a center position of another pixel 122 in the diagonal direction. The first sub image beam IL1 and the second sub image beam IL2 respectively carry screen information displayed on the display panel 110, wherein the offset distance DP is, for example, in a direction parallel to the diagonal direction of the pixels 112. In an embodiment, the offset distance DP is, for example, one-half the pitch PI of the pixels 112, as illustrated in FIG. 3. Thus, after the first sub image beam IL1 and the second sub image beam IL2 pass through the pupil, since the offset distance DP is smaller than the pitch PI of the diagonal direction of single pixel 112, when a frequency at which the first sub image beam IL1 and the second sub image beam IL2 are alternately transmitted is, for example, greater than 120 Hz, the human eye cannot identify the first sub image beam IL1 and the second sub image beam IL2 as being alternately generated. In this way, by the effect of persistence of vision, the human eye naturally synthesizes the first sub image beam IL1 and the second sub image beam IL2 into a high-resolution image.

In addition, it is worth mentioning that, with respect to the display panel 110 having the pixels 112 of a different size, in the display device 100 of the invention, to correspond to the size of the pixels 112 of the display panel 110, it is only necessary to adjust the thickness T of the gas layer 124 in the optical element 120 so as to adjust the offset distance DP between the first sub image beam IL1 and the second sub image beam IL2. In this way, the invention can be applied to the display panel 110 having the pixels 112 of various different sizes by adjusting the thickness T of the gas layer 124 in the optical element 120.

Figure 4:
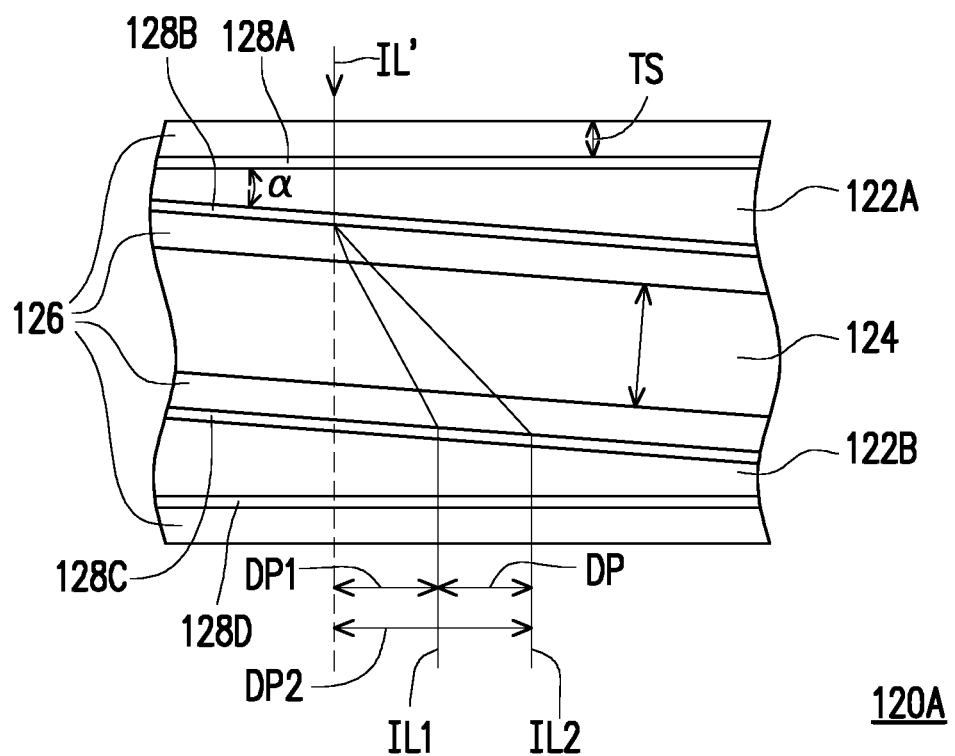
FIG. 4 is a schematic enlarged view of an optical element in area A in FIG. 1 according to another embodiment.

FIG. 4 is a schematic enlarged view of an optical element in area A in FIG. 1 according to another embodiment. Referring to FIG. 4, an optical element 120A of the present embodiment is similar to the optical element 120 of FIG. 2, and a difference between the two optical elements 120A and 120 lies in that, in the present embodiment, the first birefringent layer 122A and the second birefringent layer 122B are liquid crystal layers and an image beam IL' is a polarized beam. In accordance with a change in the first birefringent layer 122A after the image beam IL' is transmitted to the first birefringent layer 122A, the first sub image beam IL1 and the second sub image beam IL2 are alternately generated from the image beam IL' when the image beam IL' enters the gas layer 124.

Specifically, in the present embodiment, the optical element 120A further includes a first transparent conductive layer 128A, a second transparent conductive layer 128B, a third transparent conductive layer 128C and a fourth transparent conductive layer 128D. The first transparent conductive layer 128A is disposed on the first birefringent layer 122A, the second transparent conductive layer 128B is disposed on the first birefringent layer 122A, and the first birefringent layer 122A is located between the first transparent conductive layer 128A and the second transparent conductive layer 128B. The first transparent conductive layer 128A and the second transparent conductive layer 128B are configured to cause phase modulation in the first birefringent layer 122A. The third transparent conductive layer 128C is disposed on the second birefringent layer 122B, the fourth transparent conductive layer 128D is disposed on the second birefringent layer 122B, and the second birefringent layer 122B is located between the third transparent conductive layer 128C and the fourth transparent conductive layer 128D. The third transparent conductive layer 128C and the fourth transparent conductive layer 128D are configured to cause phase modulation in the second birefringent layer 122B.

In other words, by applying a voltage to the first transparent conductive layer 128A and the second transparent conductive layer 128B, a phase of the first birefringent layer 122A can be sequentially changed; by applying a voltage to the third transparent conductive layer 128C and the fourth transparent conductive layer 128D, a phase of the second birefringent layer 122B can be sequentially changed. Thus, when the image beam IL' is transmitted to the first birefringent layer 122A, by the first birefringent layer 122A, the first sub image beam IL1 and the second sub image beam IL2 having different deflection angles are sequentially generated from the image beam IL'. When the first sub image beam IL1 and the second sub image beam IL2 pass through the second birefringent layer 122B during transmission, the first sub image beam IL1 and the second sub image beam IL2 are refracted back in a transmission direction in which they were originally incident on the optical element 120A. After the first sub image beam IL1 and the second sub image beam IL2 are emitted from the second birefringent layer 122B, the transmission path of the first sub image beam IL1 and the transmission path of the second sub image beam IL2 are offset from each other by the offset distance DP. For example, when the first sub image beam IL1 is generated, a direction of liquid crystal molecules of the first birefringent layer 122A and the second birefringent layer 122B has a first refractive index with respect to the image beam IL' (which is, for example, linearly polarized light); when the second sub image beam IL2 is generated, the direction of the liquid crystal molecules of the first birefringent layer 122A and the second birefringent layer 122B is rotated to have a second refractive index with respect to the image beam IL' (which is, for example, linearly polarized light). Accordingly, the first sub image beam IL1 and the second sub image beam IL2 pass the boundary between the liquid crystal layers and the gas layer 124 at different polarization angles, thus resulting in the offset distance DP. The deflection manner of the first sub image beam IL1 and the second sub image beam IL2 has been taught in the descriptions related to the embodiments of FIGS. 1 and 2, and will not be repeated herein.

Figure 5:
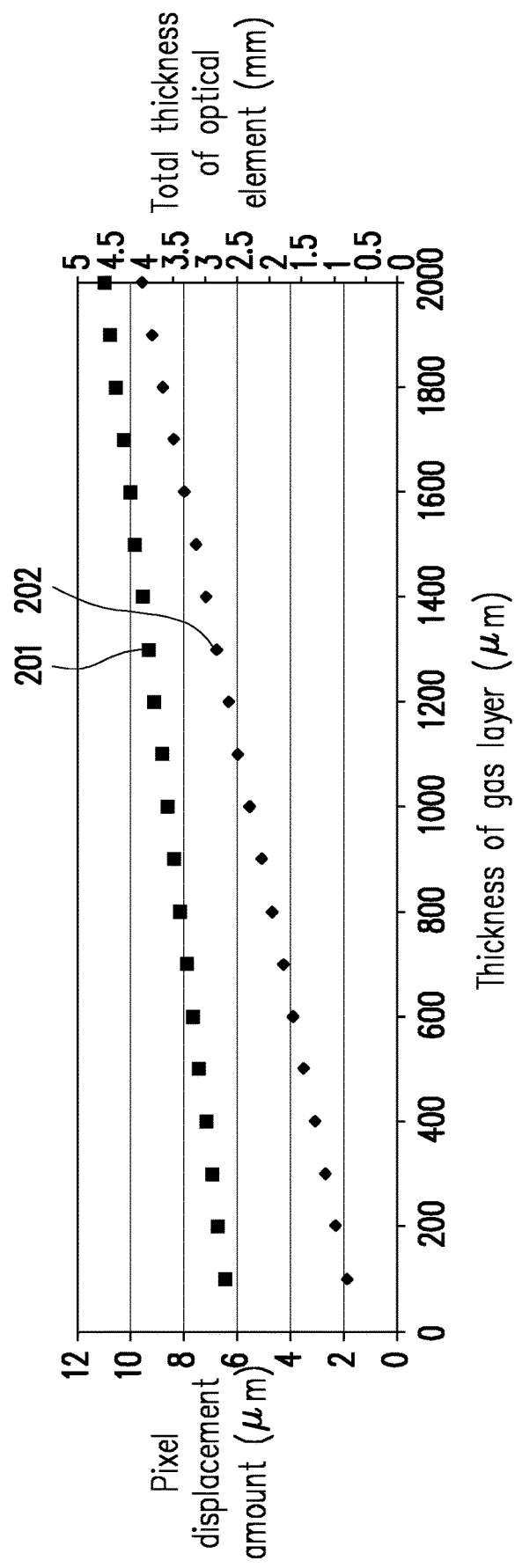
FIG. 5 shows relationships between thickness of the optical element of FIG. 1, air layer thickness and pixel displacement amount.

FIG. 5 shows relationships between thickness of the optical element of FIG. 1, gas layer thickness and pixel displacement amount. Referring to FIG. 1, FIG. 2, FIG. 3, FIG. 4 and FIG. 5, in the present embodiment, the first sub image beam IL1 and the second sub image beam IL2 are generated from the image beam IL when the image beam IL passes through the optical element 120 during transmission, and a distance ΔX (i.e., offset distance DP) between these two sub image beams accords to the following formulae:

$$\Delta X = \Delta Xe - \Delta Xo \quad (1)$$

$$\Delta Xe = \frac{\sin(F2 - \alpha) \times T}{\cos(F2)} + \frac{\sin(F4 - \alpha) \times 2Ts}{\cos(F4)} \quad (2)$$

$$\Delta Xo = \frac{\sin(F3 - \alpha) \times T}{\cos(F3)} + \frac{\sin(F5 - \alpha) \times 2Ts}{\cos(F5)} \quad (3)$$

$$F1 = \sin\alpha \quad (4)$$

$$F2 = \sin^{-1}(no \times F1) \quad (5)$$

$$F3 = \sin^{-1}(ne \times F1) \quad (6)$$

$$F4 = \sin^{-1}\left(no \times \frac{F1}{ns}\right) \quad (7)$$

$$F5 = \sin^{-1}\left(ne \times \frac{F1}{ns}\right) \quad (8)$$

In the above, when the second sub image beam IL2 passes through the optical element 120A, ΔXe represents a distance (i.e., second offset distance DP2) between the transmission direction of the second sub image beam IL2 and the extended transmission direction of the image beam IL. When the first sub image beam IL1 passes through the optical element 120A, ΔXo represents a distance (i.e., first offset distance DP1) between the transmission direction of the first sub image beam IL1 and the extended transmission direction of the image beam IL. α represents the angle between the extension direction D1 of the gas layer 124 and the extension direction D2 of the optical element 120. In detail, in an embodiment, a represents an included angle of an end portion of the wedge formed by the first birefringent layer 122A or the second birefringent layer 122B. T represents the thickness of the gas layer 124, and TS represents a thickness of the substrate 126. As known by persons skilled in the art, no represents an ordinary refractive index of the first birefringent layer 122A and the second birefringent layer 122B, ne represents an extraordinary refractive index of the first birefringent layer 122A and the second birefringent layer 122B, and ns represents a refractive index of the substrate 126.

The left vertical axis in FIG. 5 is labeled "pixel displacement amount," indicating an offset degree of the pixel 112 formed by the first sub image beam IL1 and the second sub image beam IL2, i.e., the offset distance DP, and the unit thereof is micrometer (μm). In addition, the right vertical axis in FIG. 5 is labeled "total thickness of optical element," indicating a distance (the total thickness TA of the optical element 120) between two opposite sides of the optical element 120 through which the image beam IL passes during transmission, and the unit thereof is millimeter (mm). In addition, the horizontal axis in FIG. 5 is labeled "thickness of gas layer," indicating the thickness T of the gas layer 124, and the unit thereof is micrometer (μm). Specifically, data 201 listed in the relationship diagram in FIG. 5 corresponds to the left vertical axis and the horizontal axis in FIG. 5, and data 202 listed in the relationship diagram in FIG. 5 corresponds to the right vertical axis and the horizontal axis in FIG. 5. In the present embodiment, the conditions for obtaining the data 201 and 202 include, for example, using E7 liquid crystal such as passive twisted nematic (TN) liquid crystal mixture as the material of the first birefringent layer 122A and the second birefringent layer 122B, and setting the thickness TS of the substrate 126 to 0.55 mm and the angle α between the extension direction D1 of the gas layer 124 and the extension direction D2 of the optical element 120 to 1.06 degree. Therefore, from the above data, it is known that in the display device 100 using the optical element 120 according to the invention, for example, in the display device 100 including the display panel 110 having the pixels 112 of 7.8 μm in size, the effect of improving resolution can be achieved simply by setting the total thickness TA of the optical element 120 to 3.2 mm, and the thickness of the gas layer 124 is 800 μm, as shown in FIG. 5.

In summary, the embodiments of the invention at least have one of the following advantages or effects. In the embodiments of the invention, the optical element includes the first birefringent layer, the second birefringent layer and the gas layer, and the optical element is disposed between the display panel and the lens element, wherein the extension direction of the gas layer is inclined with respect to the extension direction of the optical element, and the gas layer is disposed between the first birefringent layer and the second birefringent layer. Accordingly, when the display panel emits the image beam, the image beam passes through the first birefringent layer, the gas layer, the second birefringent layer and the lens element in sequence. Moreover, the first sub image beam and the second sub image beam having different deflection angles are generated from the image beam when the image beam enters the gas layer, wherein the transmission path of the first sub image beam and the transmission path of the second sub image beam are offset from each other by the offset distance after the first sub image beam and the second sub image beam are emitted from the second birefringent layer. Thus, the user will see the high-resolution image synthesized by the first sub image beam and the second sub image beam.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical element configured to allow an image beam passing through, the optical element comprising a first birefringent layer, a second birefringent layer and a gas layer, wherein
    the gas layer has a thickness and is disposed between the first birefringent layer and the second birefringent layer, and is an enclosed space enclosed by a first substrate between the gas layer and the first birefringent layer, a second substrate between the gas layer and the second birefringent layer, and a plurality of supports disposed around the gas layer, and an extension direction of the gas layer is inclined with respect to an extension direction of the optical element by a non-zero angle, wherein the image beam passes through the first birefringent layer, the gas layer and the second birefringent layer in sequence, wherein a first sub image beam and a second sub image beam having different deflection angles are generated from the image beam when the image beam enters the gas layer, and the first sub image beam and the second sub image beam are offset from each other by an offset distance after being emitted from the second birefringent layer.

2. The optical element according to claim 1, wherein the image beam comprises a first polarized beam and a second polarized beam which alternately appear, the first sub image beam and the second sub image beam are generated respectively from the first polarized beam and the second polarized beam when the first polarized beam and the second polarized beam enter the gas layer, and the first polarized beam and the second polarized beam have polarization directions perpendicular to each other.

3. The optical element according to claim 1, wherein the first birefringent layer and the second birefringent layer are liquid crystal layers.

4. The optical element according to claim 3, wherein the image beam is a polarized beam, and in accordance with a change in the first birefringent layer after the image beam is transmitted to the first birefringent layer, the first sub image beam and the second sub image beam are alternately generated from the image beam when the image beam enters the gas layer.

5. The optical element according to claim 4, further comprising:
    a first transparent conductive layer disposed on the first birefringent layer;
    a second transparent conductive layer disposed on the first birefringent layer, the first birefringent layer being located between the first transparent conductive layer and the second transparent conductive layer, the first transparent conductive layer and the second transparent conductive layer being configured to cause phase modulation in the first birefringent layer;
    a third transparent conductive layer disposed on the second birefringent layer; and
    a fourth transparent conductive layer disposed on the second birefringent layer, the second birefringent layer being located between the third transparent conductive layer and the fourth transparent conductive layer, the third transparent conductive layer and the fourth transparent conductive layer being configured to cause phase modulation in the second birefringent layer.

6. The optical element according to claim 1, wherein the offset distance is related to an inclination angle of the gas layer, the thickness of the gas layer, and birefringence of the first birefringent layer and the second birefringent layer.

7. The optical element according to claim 1, wherein the first birefringent layer and the second birefringent layer have a wedge shape.

8. The optical element according to claim 1, wherein the gas layer is an air layer.

9. The optical element according to claim 1, wherein the extension direction of the gas layer and the extension direction of the optical element have an angle of 0 degree to 5 degrees therebetween.

10. A display device, comprising a display panel, an optical element and a lens element, wherein
    the display panel is configured to provide an image beam;
    the optical element is disposed on one side of the display panel and is configured to allow the image beam passing through, the optical element comprising a first birefringent layer, a second birefringent layer and a gas layer, wherein
    the gas layer has a thickness and is disposed between the first birefringent layer and the second birefringent layer, and is an enclosed space enclosed by a first substrate between the gas layer and the first birefringent layer, a second substrate between the gas layer and the second birefringent layer, and a plurality of supports disposed around the gas layer;
    the optical element is disposed between the display panel and the lens element, wherein an extension direction of the gas layer is inclined with respect to an extension direction of the optical element by a non-zero angle, the image beam provided by the display panel passes through the first birefringent layer, the gas layer, the second birefringent layer and the lens element in sequence, a first sub image beam and a second sub image beam having different deflection angles are generated from the image beam when the image beam enters the gas layer, and the first sub image beam and the second sub image beam are offset from each other by an offset distance after being emitted from the second birefringent layer.

11. The display device according to claim 10, wherein the display panel comprises a plurality of pixels arranged in array, and the offset distance is smaller than a pitch of the pixels in a diagonal direction.

12. The display device according to claim 10, wherein the image beam comprises a first polarized beam and a second polarized beam which alternately appear, the first sub image beam and the second sub image beam are generated respectively from the first polarized beam and the second polarized beam when the first polarized beam and the second polarized beam enter the gas layer, and the first polarized beam and the second polarized beam have polarization directions perpendicular to each other.

13. The display device according to claim 10, wherein the first birefringent layer and the second birefringent layer are liquid crystal layers.

14. The display device according to claim 13, wherein the image beam is a polarized beam, and in accordance with a change in the first birefringent layer after the image beam is transmitted to the first birefringent layer, the first sub image beam and the second sub image beam are alternately generated from the image beam when the image beam enters the gas layer.

15. The display device according to claim 14, wherein the optical element further comprises:
   a first transparent conductive layer disposed on the first birefringent layer;
   a second transparent conductive layer disposed on the first birefringent layer, the first birefringent layer being located between the first transparent conductive layer and the second transparent conductive layer, the first transparent conductive layer and the second transparent conductive layer being configured to cause phase modulation in the first birefringent layer;
   a third transparent conductive layer disposed on the second birefringent layer; and
   a fourth transparent conductive layer disposed on the second birefringent layer, the second birefringent layer being located between the third transparent conductive layer and the fourth transparent conductive layer, the third transparent conductive layer and the fourth transparent conductive layer being configured to cause phase modulation in the second birefringent layer.

16. The display device according to claim 10, wherein the offset distance is related to an inclination angle of the gas layer, the thickness of the gas layer, and birefringence of the first birefringent layer and the second birefringent layer.

17. The display device according to claim 10, wherein the first birefringent layer and the second birefringent layer have a wedge shape.

18. The display device according to claim 10, wherein the gas layer is an air layer.

19. The display device according to claim 10, wherein the extension direction of the gas layer and the extension direction of the optical element have an angle of 0 degree to 5 degrees therebetween.

20. The display device according to claim 10, wherein the first sub image beam and the second sub image beam carry screen information displayed by the display panel.

* * * * *